Figure 4:
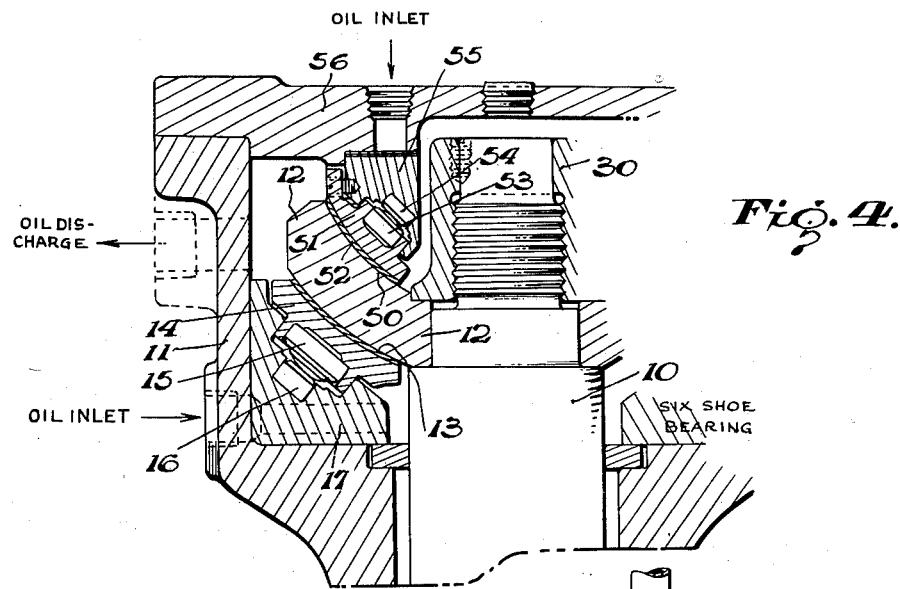

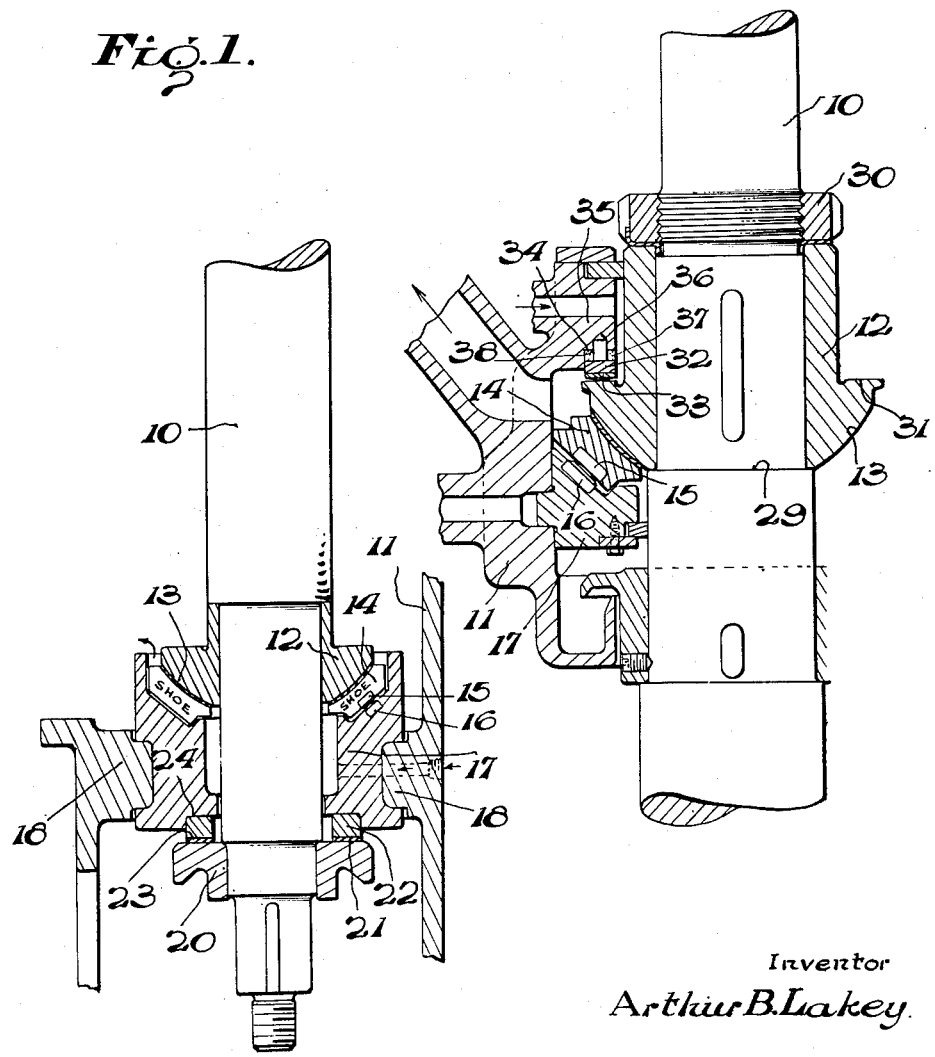

INVENTOR.
Arthur B. Lakey

Patented Sept. 25, 1951

2,569,178

UNITED STATES PATENT OFFICE 2,569,178

SPHERICAL THRUST BEARING

Arthur B. Lakey, Philadelphia, Pa., assignor to Kingsbury Machine Works, Inc., Philadelphia, Pa., a corporation of Delaware Application January 8, 1947, Serial No. 720,812

8 Claims. (Cl. 308—160)

This invention relates to improvements in spherical and conical thrust bearings. The invention will be explained by reference to its application to a spherical thrust bearing, but it is to be expressly understood that the invention is equally applicable to a conical thrust bearing wherein the same considerations arise.

Spherical bearings have the advantage that a single bearing performs both the functions of sustaining the thrust, as in the case of a plane thrust bearing, and guiding the rotatable parts in radial directions, as in a journal bearing. Spherical thrust bearings may be applied to a wide variety and sizes of machines, from large hydroelectric units to much smaller machines, such as motor driven pumps, and it sometimes occurs, in applications of spherical thrust bearings that an abnormal load, ordinarily temporary in character, is sufficient to separate the bearing surfaces of the spherical thrust bearing. Thus in the case of a hydroelectric unit using a vertical shaft there may be at times an abnormal upward hydraulic thrust which temporarily exceeds the weight of the parts sustained by the thrust bearing members and the normal downward hydraulic load. Again, the shaft with which the spherical thrust bearing is associated may at times be subjected to a mechanical unbalance producing a component in a direction tending to separate the spherical thrust bearing surfaces that exceeds the forces tending to hold them in contact.

It is at once apparent that whenever the force or component of force acting lengthwise of the axis of the shaft is sufficient to separate the bearing surfaces of the spherical thrust bearing, the spherical thrust bearing at once loses its capacity to function as a radial or guide bearing. Accordingly, it has heretofore been proposed to provide a cylindrical surface on the thrust collar, or some other suitable part associated with the shaft, with a radial bearing which will function like a journal bearing to guide the rotating parts whenever the spherical bearing surfaces are so separated, so as to prevent any undesired radial displacement of the rotating parts under this condition. But such a radial bearing, if provided with usual bearing clearances, introduces a constantly acting power loss because of the friction at the radial bearing. To reduce the power loss due to the presence of the constantly functioning radial bearing it has been proposed to make the bearing clearance therein larger than usual bearing clearances, but such a construction equally increases the extent to which the parts may have radial movement upon separation of the spherical bearing surfaces. Furthermore, such a construction includes no provision for limiting the extent to which the parts may move lengthwise of the axis of the shaft under forces tending to separate the spherical bearing surfaces, while at the same time as the radial bearing so used must, when the spherical surfaces are separated, be of sufficient strength to carry the radial load, the addition of such a radial bearing has materially added to the size and weight of the bearing structure as a whole. It has also been proposed to associate with the thrust collar certain guard structures which are capable of preventing an excessive displacement of the rotatable bearing parts lengthwise of the axis of the shaft, but over and above inherent disadvantages in using stationary parts for stopping rotatable members, such a device if used by itself provides no guiding function after the spherical surfaces are separated, while if used in conjunction with a radial bearing the weight and size of the structure as a whole is increased without eliminating the disadvantages above referred to as implicit in the use of a radial bearing.

It is an object of this invention to provide a spherical thrust bearing with means which overcome the foregoing disadvantages and provide a bearing which comes into action upon separation of the bearing surfaces of the spherical bearing so as to limit the extent to which the parts may move in the direction of the axis of the shaft, functioning itself as a thrust bearing to sustain the abnormal load or component of load tending to separate the spherical bearing surfaces, and also acting to prevent the spherical thrust bearing surfaces from losing their capacity to act as a guide bearing while such forces tending to separate the spherical thrust bearing surfaces are acting.

Another object of this invention is to provide an improved spherical thrust bearing which accomplishes the foregoing purposes without requiring the use of a radial bearing.

Another object of this invention is to provide an improved spherical thrust bearing with complishes the foregoing purposes without unduly adding to the weight and size of the bearing structure as a whole.

Another object of this invention is to provide an improved spherical thrust bearing which accomplishes the foregoing purposes without introducing undesirable power losses.

Another object of this invention is to provide an improved spherical thrust bearing with the spherical surfaces are retained in such relationship as to continue to perform their guiding function following the occurrence of an abnormal load or component of load which tends to separate the spherical bearing surfaces.

Another object of this invention is to provide an improved spherical thrust bearing which means to prevent abnormal separation of the spherical bearing surfaces that will function as a thrust bearing to sustain the abnormal load.

Other objects will appear as the description of the invention proceeds.

The invention is capable of receiving a variety of mechanical expressions several of which are illustrated, more or less diagrammatically, on the accompanying drawings, but it is to be expressly understood that the drawings are for purposes of illustration only, and are not to be construed as definitions of the limits of the invention, reference being had to the appended claims for that purpose.

Figure 3:
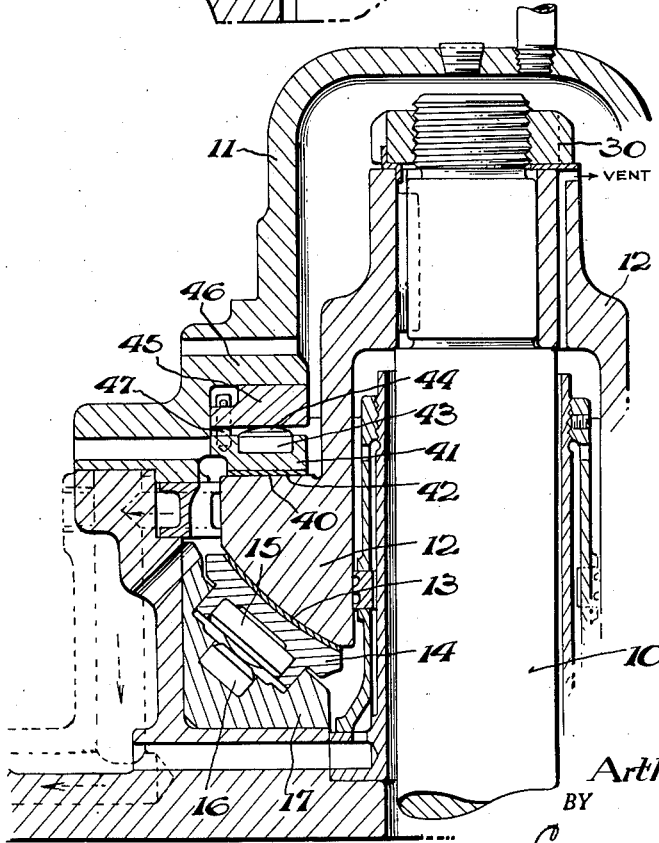

Referring in detail to the drawings, wherein the same reference characters are employed to designate corresponding parts in the several figures, Fig. 1 is a schematic elevation, partly in section, of an embodiment of the present invention;

Fig. 2 is a similar view showing one half of another embodiment of the present invention; and Figs. 3 and 4 are similar views but on a larger scale illustrating other embodiments of the present invention.

Referring first to the diagrammatic showing of Fig. 1, 10 designates any suitable shaft within the housing 11 of a spherical thrust bearing of any suitable construction. As here shown said bearing comprises a thrust block or collar 12, secured on the shaft in any suitable way and provided with a spherical bearing surface 13 of any suitable character, and any suitable number of spherically faced bearing shoes 14, preferably mounted in conformity with the principles of the Kingsbury bearings so as to tilt in all directions and hence illustrated as provided with hardened blocks 15 for coaction with hardened blocks 16, at least one block of each pair having a curved face, blocks 16 being carried by a base ring 17 of any suitable construction and shown as rigidly mounted in position by suitable frame or housing parts 18.

Also mounted on the shaft 10, and here shown as disposed at the opposite side of the base ring 17 from the spherical thrust bearing, is an auxiliary bearing collar 20 secured to the shaft to rotate therewith in any suitable way. Collar 20 is provided with a plane bearing surface 21 of any suitable character disposed in a plane at right angles to the axis of the shaft, and coacting therewith is a stationary bearing structure 22 provided with a bearing surface 23 of any suitable character. The stationary bearing structure 22 may be supported in any suitable way, it here being shown as mounted on the base ring 17, and it may be of any suitable construction, as composed of a suitable number of separate stationary bearing members of any proper arcuate extent, but is shown as a continuous bearing ring received in a recess 24 in the base ring 17 so as to be retained against displacement with respect thereto in both axial and radial directions.

As installed bearing surfaces 21 and 22 are provided with any suitable clearance determined to conform with what is considered the maximum desirable separation of the spherical bearing surfaces under the abnormal load or component of load hereinbefore referred to. Assume for purposes of illustration that the spherical thrust bearing is so constructed that the resultant load is transmitted from the thrust collar 12 to the bearing shoes 14 at an angle of 45° with respect to the axis of the shaft. Under normal operating conditions the thrust load is transmitted from the shaft through the spherical thrust bearing to the base ring 17, and as well understood with respect to spherical bearings, the spherical bearing also functions to guide the rotatable parts in radial directions. Assume now that a maximum separation of the spherical bearing surfaces of 0.010 inch is desired. The bearing surfaces 21 and 23 are installed with a clearance of 0.010 inch. Now if an abnormal force acts lengthwise of the axis of the shaft, vertically and upwardly as viewed in Fig. 1, sufficient to separate the thrust collar 12 from the bearing shoes 14, the bearing surfaces 21 and 23 promptly come into operation by reason of the auxiliary collar 20 moving with the shaft toward the stationary bearing structure 22, and not only is the extent of axial movement of the shaft restricted to the foregoing clearance, but the auxiliary bearing provided by elements 20 and 22 temporarily sustain the upward thrust, as viewed in Fig. 1, functioning as a thrust bearing. Furthermore, as the spherical bearing surfaces cannot move apart by more than the foregoing clearance of 0.010 inch, the spherical surface 13 on the thrust block 12, owing to the mathematical characteristics of a 45° angle under the conditions assumed, has its clearance from the bearing surfaces of the shoes 14 in a radial direction increased by only 0.010 inch, so that the spherical thrust bearing is made to retain its guiding function notwithstanding the axially acting force tending to separate the spherical surfaces. Similarly, if a mechanical unbalance is assumed so that there is an axial component of force tending to move the spherical bearing surfaces apart, the auxiliary bearing 20, 22 again comes into operation to prevent either radial or axial displacement of the thrust collar 12 with respect to the thrust bearing shoes 14 by more than 0.010 inch in amount.

While it has been assumed that the spherical thrust bearing is so constructed that the angle of the resultant load is 45°, such angle is in no way essential. By constructing the spherical thrust bearing so that the angle of the resultant load is different, as 30° or 36°, the mathematical relationships between axial and radial components of movement can be selected to conform with the desired conditions. As the load on the auxiliary bearing 20, 22 is only an axially directed thrust if friction is disregarded, and as the component of load tending to separate these spherical bearings is not ordinarily of large magnitude as compared with the normally acting load, the auxiliary bearing 20, 22 can be made relatively light, because all of the radial guiding function is still performed by the spherical bearing. By appropriately constructing the auxiliary bearing and selecting the clearance between the bearing surfaces thereof the friction losses of the auxiliary bearing may be kept down to a minimum and thereby the power losses made much smaller than when a radial bearing has been associated with the thrust collar to function as a guide bearing when the spherical bearing surfaces are separated.

While in the embodiment of Fig. 1 the auxiliary bearing has been shown as disposed on the opposite side of the base ring 17 from the spherical thrust bearing, this is in no sense essential, as the auxiliary bearing may be mounted on the same side of the base ring as the spherical bearing. Such an embodiment is illustrated diagrammatically in Fig. 2 wherein the shaft 10 is provided with a thrust collar or block 12, here shown as keyed to the shaft and held against axial displacement by a shoulder 29 on the shaft and a threaded retaining ring 30. Thrust collar 12, as in the embodiment of Fig. 1, has a spherical bearing surface 13 of any suitable character with which cooperates any suitable number of spherically faced bearing shoes 14 provided with hardened blocks 15 cooperating with hardened blocks 16 carried by a base ring 17 rigidly held in position in any suitable way by the frame or housing portion 18. In this embodiment the rotatable bearing element of the auxiliary bearing is provided as a plane bearing face 31 on the collar 12 in a plane at right angles to the axis of the shaft, and cooperating therewith is a stationary bearing structure 32 provided with any suitable bearing surface 33. As here shown, the stationary bearing structure 32 is received in a recess 34 provided in a stationary portion 35 of the frame or housing although, if desired, this stationary bearing structure may be carried by a mere spider or the like secured by its legs to the base ring or to the frame or housing parts associated therewith. Stationary bearing structure 32 may be of any suitable construction as heretofore pointed out in conjunction with the embodiment of Fig. 1, being shown in the form of a continuous ring prevented from rotation by one or more dowel pins 36 carried by the stationary portion 35 and engaging in one or more grooves 37 provided in the ring. Bearing ring 32 may be suitably positioned in the recess 34 by use of one or more shims 38 so as to provide the desired clearance between the bearing faces of the auxiliary bearing 31, 32. It will be observed that this auxiliary bearing will function in the same way as heretofore described with respect to the embodiment of Fig. 1.

While in the embodiments so far described the auxiliary bearing has its stationary bearing structure in the form of a ring, any other suitable construction of bearing may be employed. Thus in the embodiment of Fig. 3, wherein the parts are similarly designated as in Fig. 2 except for the auxiliary bearing, the thrust collar 12 is provided with a plane bearing surface 40 disposed in a plane at right angles to the axis of the shaft, but here the stationary bearing structure of the auxiliary bearing takes the form of a suitable number of bearing shoes 41, two or three for example, symmetrically arranged with respect to the axis of the shaft and having bearing surfaces 42 of any suitable character. As shown said shoes are provided with hardened blocks 43 having curved rear surfaces 44 by which they are mounted on any suitable ring or load-equalizing structure 45 received in a recess provided in the frame or housing portion 46. The shoes 41 are prevented from rotation by suitable dowels 47 carried by the ring 45 and projecting into slots or recesses provided in the shoes.

As so far described, the auxiliary bearing has in each case been a plane bearing including a rotatable bearing element having its bearing face in a plane at right angles to the axis of the shaft. However, this is not essential as the auxiliary bearing may take the form of a spherical or conical bearing. Thus in the embodiment of Fig. 4 wherein, with the exception of the auxiliary bearing, the parts are designated the same as in Figs. 2 and 3, the rear face of the thrust collar 12 is provided with a spherical bearing surface 50 of any suitable character, and the stationary bearing structure of the auxiliary bearing takes the form of any suitable number of shoes 51, for example two or three, symmetrically arranged with respect to the axis of the shaft and having spherical bearing surfaces 52 of any suitable character, said shoes being shown as provided with hardened blocks 53 cooperating with hardened blocks 54, which blocks may be like or similar to blocks 15 and 16, carried by a stationary ring 55 mounted on a stationary portion 56 of the frame or housing structure. This construction is appropriate where the maximum radial load to be anticipated is not excessive for the auxiliary spherical bearing.

It will be apparent that the auxiliary bearings 40, 41 of Fig. 3 and 50, 51 of Fig. 4 will function in the same manner as heretofore explained in conjunction with the embodiments of Figs. 1 and 2, except that in the case of Fig. 4 the greatest radial freedom occurs when the shaft has moved through one half of its permitted displacement.

It will therefore be perceived that by the present invention a spherical thrust bearing has been provided with an auxiliary bearing which prevents undesired separation of the spherical bearing surfaces and retains the spherical bearing surfaces in such cooperative relationship that they continue to perform their guiding function when forces act on the bearing tending to separate the spherical bearing surfaces, while at the same time the auxiliary bearing temporarily acts to sustain the load which is acting to separate the spherical bearing surfaces. This has been effected while avoiding the power losses unavoidably present when a guide or radial bearing is associated with the thrust collar or other suitable part as heretofore proposed, and as the load on the auxiliary bearing is flat is only an axially acting load, and one which is not ordinarily of large magnitude when compared with the normal load, the auxiliary bearing may be provided by parts whose size and strength are small when compared with what has heretofore been required when supplying a radial bearing that is strong enough to take over the guide bearing function when the spherical surfaces of the thrust bearing become separated. At the same time undesired separation of the spherical bearing surfaces is prevented without introduction of the disadvantages implicit in providing the frame or housing of the thrust bearing with a mere stationary part to be engaged in the event of an undue separation of the spherical bearing surfaces.

While the embodiments of the invention illustrated on the drawings have been described with considerable particularity, it is to be expressly understood that the invention is not restricted thereto, as the same is capable of receiving a variety of mechanical expressions some of which will now readily suggest themselves to those skilled in the art. While particular forms of auxiliary bearing have been illustrated and described by way of example, it is to be expressly understood that the invention is not to be restricted thereto, because other forms of auxiliary bearing may be used. The invention may also be used with other forms of spherical and conical thrust bearings, and incorporated in a wide variety of sizes, types and applications of spherical and conical thrust bearings, because it lends itself to use wherever a spherical or conical thrust bearing is associated with parts that, under operating conditions, may be subjected to abnormal loads or unbalanced conditions such as to produce a force or component of force acting in the direction of the axis of the shaft sufficient to separate the bearing surfaces of the thrust bearing. As will also be apparent to those skilled in the art, changes may be made in the details of construction, arrangement, proportion, etc., of the parts without departing from the invention. Reference is therefore to be had to the appended claims for a definition of said invention.

What is claimed is:

1. In an improved thrust bearing of the character referred to, in combination with a rotatable shaft and a thrust bearing therefor comprising members having a pair of opposed coacting rotatable and stationary bearing surfaces shaped to function both as a thrust bearing and as a guide bearing, said bearing surfaces having a bearing clearance therebetween, means for preventing such separation of said bearing surfaces that said surfaces cease to function as a guide bearing including an auxiliary bearing comprising a member having a rotatable bearing surface carried by and extending outwardly from the shaft and a stationary bearing means having a bearing surface opposed to said last named rotatable bearing surface and adapted to cooperate with said rotatable bearing surface in providing a thrust bearing on the occurrence of a force sufficient to separate said first named bearing surfaces, said auxiliary bearing surfaces having a clearance greater than said bearing clearance but small enough to prevent said first named bearing surfaces separating sufficiently to lose their function as a guide bearing.

2. In an improved thrust bearing of the character referred to, in combination with a rotatable shaft and a thrust bearing therefor comprising members having a pair of opposed coacting rotatable and stationary bearing surfaces shaped to function both as a thrust bearing and as a guide bearing, said bearing surfaces having a bearing clearance therebetween, means for preventing such separation of said bearing surfaces that said surfaces cease to function as a guide bearing including an auxiliary bearing comprising a member having a rotatable bearing surface carried by the shaft and disposed in a plane at right angles to the axis of the shaft, and a stationary bearing means having a bearing surface opposed to said last named rotatable bearing surface and adapted to cooperate with said rotatable bearing surface in providing a thrust bearing on the occurrence of a force sufficient to separate said first named bearing surfaces, said auxiliary bearing surfaces having a clearance greater than said bearing clearance but small enough to prevent said first named bearing surfaces separating sufficiently to lose their function as a guide bearing.

3. In an improved thrust bearing of the character referred to, in combination with a rotatable shaft and a thrust bearing therefor comprising members having a pair of opposed coacting rotatable and stationary bearing surfaces shaped to function both as a thrust bearing and as a guide bearing, said bearing surfaces having a bearing clearance therebetween, means for preventing such separation of said bearing surfaces that said surfaces cease to function as a guide bearing including an auxiliary bearing member comprising means on said first named rotatable member providing a rotatable bearing surface extending outwardly from the shaft, and a stationary bearing means having a bearing surface opposed to said last named rotatable bearing surface and adapted to cooperate with said rotatable bearing surface in providing a thrust bearing on the occurrence of a force sufficient to separate said first named bearing surfaces, said auxiliary bearing surfaces having a clearance greater than said bearing clearance but small enough to prevent said first named bearing surfaces separating sufficiently to lose their function as a guide bearing.

4. In an improved thrust bearing of the character referred to, in combination with a rotatable shaft and a thrust bearing therefor comprising members having a pair of opposed coacting rotatable and stationary bearing surfaces shaped to function both as a thrust bearing and as a guide bearing, said bearing surfaces having a bearing clearance therebetween, means for preventing such separation of said bearing surfaces that said surfaces cease to function as a guide bearing including an auxiliary bearing comprising a member having a rotatable bearing surface carried by and extending outwardly from the shaft and a stationary bearing means mounted on said first named stationary bearing member and having a bearing surface opposed to said last named rotatable bearing surface for cooperation therewith in providing a thrust bearing on the occurrence of a force sufficient to separate said first named bearing surfaces, said auxiliary bearing surfaces having a clearance greater than said bearing clearance but small enough to prevent said first named bearing surfaces separating sufficiently to lose their function as a guide bearing.

5. An improved thrust bearing comprising a vertical shaft, a combined thrust and guide bearing therefor comprising a bearing member rotating with said shaft and a bearing member stationary relative to the shaft, the cooperating bearing surfaces of said members being shaped to function as a thrust bearing supporting the vertical load of the shaft and also as a radial guide bearing for the shaft as long as radial clearance between said bearing surfaces is maintained within a predetermined maximum, and means for limiting vertical upward movement of said shaft at a point at which the radial clearance between said bearing surfaces is within said maximum comprising an auxiliary rotatable member carried by said shaft and having a bearing surface extending outwardly therefrom and an auxiliary stationary member normally free of bearing engagement with rotating parts but having a bearing surface spaced vertically from and opposed to the surface of said auxiliary rotatable member, the vertical clearance between said opposed auxiliary bearing surfaces limiting the upward movement of said shaft as aforesaid.

6. An improved thrust bearing for a vertical shaft comprising a bearing member rotating with the shaft and a bearing member stationary relative to the shaft, said members having cooperating spherically shaped surfaces for supporting the vertical load of the shaft and for guiding the shaft radially, and means for limiting vertical upward movement of said shaft at a point at which the radial clearance between said bearing surfaces is within a predetermined maximum for effective radial guiding of the shaft comprising an auxiliary rotatable member carried by said shaft and having a bearing surface extending outwardly therefrom and an auxiliary stationary member normally free of bearing engagement with rotating parts but having a bearing surface spaced vertically from and opposed to the surface of said auxiliary rotatable member, the vertical clearance between said opposed auxiliary bearing surfaces limiting the upward movement of said shaft as aforesaid.

7. An improved thrust bearing for a vertical shaft comprising rotatable bearing means carried by said shaft and providing two bearing surfaces one spherically shaped and the other disposed in a radial plane, stationary bearing means shaped to cooperate with said spherical surface for supporting the vertical load of the shaft and for guiding the shaft radially, and an auxiliary stationary member normally free of bearing engagement with rotating parts and having a surface disposed in a radial plane and spaced vertically from and opposed to said first named radial surface, the vertical clearance between said opposed radial surface limiting vertical upward movement of said shaft at a point at which the radial clearance between said spherical surfaces is within a predetermined maximum for effective radial guiding of said shaft.

8. An improved thrust bearing for a vertical shaft comprising rotatable bearing means carried by said shaft and providing a spherical bearing surface, a rotatable member carried by said shaft below said rotatable means and providing a bearing surface disposed in a radial plane, and stationary bearing means surrounding said shaft between said rotatable means and member, said stationary means carrying spherical bearing means cooperating with said spherical surface to support the vertical load of the shaft and to guide the shaft radially, said stationary means also having a lower surface spaced vertically above said radially disposed surface and adapted to be engaged thereby to limit upward vertical movement of said shaft, the clearance between said last named surfaces limiting such upward movement at a point at which the radial clearance between the spherical surfaces is within a predetermined maximum for effective radial guiding of said shaft.

ARTHUR B. LAKEY.

REFERENCES CITED

The following references are of record in the file of this patent:

UNITED STATES PATENTS

| Number | Name | Date |
|---|---|---|
| 1,201,057 | Kingsbury | Oct. 10, 1916 |
| 1,385,400 | Scheibe | July 26, 1921 |
| 2,061,966 | Howarth | Nov. 24, 1936 |
| 2,191,901 | Wallgren | Feb. 27, 1940 |

FOREIGN PATENTS

| Number | Country | Date |
|---|---|---|
| 126,636 | Switzerland | July 14, 1927 |
| 703,249 | Germany | Mar. 5, 1941 |